| United States Patent [19] | [11] | 4,098,753 |
|---|---|---|
| Tsigdinos et al. | [45] | Jul. 4, 1978 |

[54] ESTER-PLASTICIZED POLYVINYL CHLORIDE RESIN COMPOSITION CONTAINING MOLYBDENUM FLAME RETARDANT AND SMOKE SUPPRESSANT AGENT

[75] Inventors: George A. Tsigdinos, Ann Arbor; Fred W. Moore, Plymouth, both of Mich.; Valerie J. Kuck, Upper Montclair; Emanuele Scalco, Bridgewater Township, Somerset County, both of N.J.

[73] Assignee: Amax Inc., New York, N.Y.

[21] Appl. No.: 714,384

[22] Filed: Aug. 16, 1976

[51] Int. Cl.² .......................... C08K 5/11; C08K 5/12; C09K 3/28; E04B 1/94
[52] U.S. Cl. .......................... 260/31.8 R; 260/31.8 W; 260/31.8 B; 260/DIG. 24
[58] Field of Search .................. 260/31.8 R, 31.8 HA, 260/DIG. 24, 31.8 W, 31.8 B

[56] References Cited

U.S. PATENT DOCUMENTS

| 3,014,000 | 12/1961 | Read | 260/31.8 H |
|---|---|---|---|
| 3,741,893 | 6/1973 | Mascioli et al. | 252/8.1 |
| 3,845,001 | 10/1974 | Mitchell | 260/31.8 R |
| 3,870,679 | 3/1975 | Mitchell et al. | 260/47.75 N |
| 3,892,667 | 7/1975 | Touval | 260/42.49 |
| 3,900,441 | 8/1975 | King | 260/31.8 HA |

OTHER PUBLICATIONS

Chem. Abstracts, vol. 79, 1973, Entry 79811c.

*Primary Examiner*—Joseph L. Schofer
*Assistant Examiner*—Peter F. Kulkosky
*Attorney, Agent, or Firm*—Harness, Dickey & Pierce

[57] ABSTRACT

A flame resistant and smoke suppressed plasticized polyvinyl chloride polymer containing from about 20 to about 80 parts per hundred resin (phr) of an ester-type plasticizer and an effective amount of a flame retardant and smoke suppressant agent comprising an inorganic molybdenum compound such as molybdenum oxides and metal molybdates. In accordance with a preferred embodiment, the flame retardant and smoke suppressant agent further includes a controlled effective amount of an antimony compound such as antimony oxide in combination with the molybdenum compound imparting synergistic flame retardancy and smoke suppressing characteristics to the plasticized polyvinyl chloride resin formulation.

13 Claims, No Drawings

ESTER-PLASTICIZED POLYVINYL CHLORIDE RESIN COMPOSITION CONTAINING MOLYBDENUM FLAME RETARDANT AND SMOKE SUPPRESSANT AGENT

BACKGROUND OF THE INVENTION

The excellent mechanical and chemical properties of vinyl chloride homopolymers and copolymers and the versatility of such polymers to compounding variations has resulted in their widespread commercial use for fabricating various structural components, decorative fabrics and films, electrical wiring, floor coverings and the like. The high level of chlorine in vinyl chloride polymers (57%) and vinylidene chloride polymers (73%) renders these resins flame resistant and self-extinguishing in a rigid non-plasticized condition. However, many commercial applications necessitate the inclusion of substantial quantities of plasticizers in such resin formulations to provide the required degree of flexibility consistent with the intended end use. The inclusion of appreciable quantities, such as from about 20 phr up to about 80 phr of ester-type plasticizers significantly reduces the flame resistance and self-extinguishing characteristics of such vinyl chloride polymers. The inclusion of such flammable ester-type plasticizers is also accompanied by an increased tendency of such plasticized formulations to generate smoke when exposed to elevated pyrolysis temperatures during fires which in many instances create a source of danger to imperilled personnel which is greater than the fire itself.

Significant improvements in the flame resistance of such plasticized vinyl chloride polymers has been achieved by incorporating effective amounts of antimony oxide but without any significant reduction in the smoke generation characteristics of such resin compositions. A variety of other organic and inorganic compounds and salts have heretofore been proposed or used to increase the flame retardancy characteristics of such plasticized vinyl chloride polymers or to reduce the smoke generation characteristics thereof, but such agents have been universally deficient in providing an optimum improvement in both of these critical properties. Some of the agents heretofore employed are toxic themselves, or form volatile toxic compounds during combustion, further aggravating the hazard associated during a fire involving articles containing such polymers. The unpredictable behavior of various additive agents on the flame resistance and smoke generation properties of plasticized polyvinyl chloride resins has heretofore resulted in resin formulations possessed of less than optimum flame retardant and smoke suppression properties.

The present invention overcomes many of the problems and disadvantages associated with plasticized vinyl chloride polymers by providing a resin formulation including effective amounts of a material which functions both as a flame retardant agent and a smoke suppressant agent, which is of comparatively low toxicity, which is not itself volatilized when heated to an elevated pyrolysis temperature, but instead remains in the char; which is more economical than any other agents heretofore employed on a cost-effectiveness basis, which is available in good supply from domestic sources, and which is of versatile use in compounding vinyl chloride polymeric compositions.

SUMMARY OF THE INVENTION

The benefits and advantages of the present invention are achieved by providing a flame resistant and smoke suppressed plasticized polyvinyl chloride polymer composition containing from about 20 to about 80 phr resin of an ester-type plasticizer selected from the group comprising phthalates, azelates, adipates, trimellitates, and mixtures thereof, and from about 1 up to about 8 phr of a flame retardant and smoke suppressant agent comprising a molybdenum compound including oxides of molybdenum and inorganic molybdenum compounds.

In accordance with a further discovery of the present invention, the flame retardant and smoke suppressant agent further includes a controlled amount of an antimony compound present in a ratio of about 0.5 up to about 2 parts per part of the molybdenum compound present, providing for a synergistic flame retardancy and smoke suppressing action, achieving better results in many instances than are attainable by employing equal quantities of either one of the constituents by themselves. The antimony constituent can be in the form of antimony oxide itself ($Sb_2O_3$), as well as other compounds containing antimony, such as sodium antimonate ($NaSbO_3$).

It is also contemplated that the molybdenum, as well as the antimony constituents of the flame retardant and smoke suppressant agent, can be employed in an extended form, such as a coating on a particulated carrier, achieving thereby further effectiveness in the availability of these constituents and a further increase in their cost-effectiveness.

Additional benefits and advantages of the present invention will become apparent upon a reading of the description of the preferred embodiments taken in conjunction with the specific examples provided.

DESCRIPTION OF THE PREFERRED EMBODIMENTS

The composition of the resin formulations and the constituents employed are described in the specification and subjoined claims on a weight basis, unless clearly indicated to the contrary. The term "phr" designates the parts per weight per hundred parts by weight resin.

The term "vinyl chloride polymer", as herein employed, is used in its broad sense and includes polymers of vinyl chloride and vinylidene chloride including homopolymers thereof, copolymers and blends of homopolymers and/or copolymers. The vinyl chloride polymer may contain up to 50% by weight of one other vinylidene monomer copolymerized therewith, while amounts of such vinylidene monomers up to about 20% are more usual. Such vinylidene monomers may include 1-olefins containing from 2 to 12 carbon atoms, and more usually from 2 to 8 carbon atoms, of which ethylene, propylene, 1-butene, isobutylene, 1-hexene, 4-methyl-1-pentene or the like, are typical. The vinylidene monomer may also include dienes having from 4 to 10 carbon atoms including conjugated dienes such as butadiene, isoprene, piperylene and the like; ethylidene norbornene and dicyclopentadiene; vinyl esters and allyl esters including vinyl acetate, vinyl chloroacetate, vinyl propionate, vinyl laurate, allyl acetate or the like; vinyl aromatics such as styrene, alpha-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as alpha-cyanomethyl acrylate, the alpha, beta and gamma-cyanopropyl acrylates and the like, olefinically unsaturated carboxylic acids and esters thereof, olefinically unsaturated acids and esters thereof, such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate and the like, and including esters of maleic and fumaric acid and the like; amides of the alpha-, beta-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol and the like; bis(beta-haloalkyl) alkenyl phosphonates such as bis(beta-chloroethyl) vinyl phosphonate and the like; etc.

The vinyl chloride polymers are further characterized as being in a plasticized condition as opposed to a non-plasticized rigid condition and for this purpose, encompass vinyl chloride polymers containing from about 20 phr up to about 80 phr of an ester-type plasticizing agent to attain a degree of flexibility ranging from semi-rigid at the lower plasticizer contents to very flexible at the upper plasticizer concentration range. The plasticizer is of the ester-type and is selected from the group consisting of phthalates, azelates, adipates, trimellitates, and mixtures thereof. Typical of the foregoing ester-type plasticizers which are in widespread commercial use in compounding plasticized polyvinyl chloride resins are diisodecyl phthalate, ditridecyl phthalate, mixed normal alkyl phthalates, dicyclohexyl phthalate, diundecyl phthalate, butyl benzyl phthalate, and the like; azelate esters including de-2-ethylhexyl azelate, di-n-hexyl azelate, and the like; adipate esters including diisodecyl adipate, dioctyl adipate, and the like; and trimellitate esters including triisooctyl trimellitate, trioctyl trimellitate, and the like.

The foregoing ester-type plasticizers are somewhat flammable and their inclusion in such plasticized polyvinyl chloride formulations substantially reduces the flame resistance and self-extinguishing characteristics of the polyvinyl chloride resin itself. For example, an unplasticized homopolymer of polyvinyl chloride in a rigid non-plasticized condition has an oxygen index generally ranging from about 42 to about 49. The incorporation of about 60 phr of dioctyl phthalate (DOP) in such resin reduces the oxygen index to about 22.2; the inclusion of 80 phr of DOP reduces the oxygen index to about 21.1; while the inclusion of about 90 phr of DOP reduces the oxygen index to about 19.2 according to comparative tests conducted. The afore-enumerated oxygen index (OI) values are obtained by subjecting specimens of the resin formulations to ASTM Test Designation D2863-70, entitled "Standard Method of Test for Flammability of Plastics Using the Oxygen Index Method".

In addition to the vinyl chloride polymer and plasticizer, the formulations of the present invention may further include conventional fillers or particulated extenders such as calcium carbonate, talc, silica, and the like, in amounts generally ranging up to about 50 phr; lubricants to facilitate processing of the resin formulation, such as stearic acid, polyethylene, paraffin wax, and the like, in amounts usually up to about 5 phr; heat and ultraviolet stabilizing agents, such as barium-cadmium-zinc soaps, epoxidized soya oil, tribasic lead stearate, and the like, present in controlled amounts usually up to about 8 phr; as well as various dyes and/or pigment agents to impart the desired color and/or opacity to the resin compositions.

In addition to the foregoing constituents, the plasticized polyvinyl chloride resin composition of the present invention contains as a dual functioning flame retardant and smoke suppressant agent, a molybdenum compound present in an effective amount ranging from about 1 up to about 8 phr, and more usually, from about 2 to about 4 phr. The molybdenum compound is introduced in the form of a finely-particulated powder, wherein each particle may consist of the molybdenum compound, or in an extended form in which the molybdenum compound is present in the form of a coating on the surfaces of a carrier particle, which may be inert or may also contribute to the flame retardancy characteristics of the resin formulation. Molybdenum compounds suitable for this purpose include molybdenum dioxide ($MoO_2$), molybdenum trioxide ($MoO_3$), as well as metal molybdate salts including ammonium dimolybdate, or ADM, $[(NH_4)_2Mo_2O_7]$; ammonium heptamolybdate, or AHM, $[(NH_4)_6Mo_7O_{24} \cdot 4H_2O]$; ammonium octamolybdate, or AOM, $[(NH_4)_4Mo_8O_{26}]$; ammonium decamolybdate, $[(NH_4)_2Mo_{10}O_{31}]$; sodium molybdate, $[Na_2MoO_4]$; calcium molybdate, $[CaMoO_4]$; zinc molybdate, $[ZnMoO_4]$; and the like. Of the foregoing, molybdenum trioxide itself comprises a preferred material and can be incorporated as a technical grade product corresponding to a material which preferably contains at least about 85% of molybdenum trioxide. The degree of purity of the molybdenum trioxide will vary depending upon its source of manufacture and the degree of purification to which it has been subjected. The degree of purity, however, is not critical since the inactive portion comprised primarily of silica and metal silicates merely serves as an extender filler in the resin formulation. Higher purity molybdenum trioxide materials can also be used, although the higher cost of such purer grades without any significant advantage over technical grade molybdenum oxide normally is not justified from an economic standpoint.

The particle size of the molybdenum compounds is not particularly critical, although it is generally desirable to employ particles of a size and configuration so as to optimize total surface area, rendering the material available for reaction and to also facilitate uniform dispersibility throughout the polyvinyl chloride resin matrix. Commercially available technical grade molybdenum oxide is usually of an average particle size less than about 20 mesh (U.S. Standard Screen Size) and can be satisfactorily employed, although powders of an average particle size less than about 10 microns are usually preferred.

The molybdenum compounds can also be introduced in the form of a coating on a particulated extender material which may itself be possessed of flame retardant characteristics such as hydrated alumina, for example. The use of a particulated extender carrier provides for cost savings over the use of particles comprised entirely of the molybdenum compounds. This is because that usually only the surface of the particle partakes in the flame retardant and smoke suppression reaction during gaseous combustion of the polymer matrix and the reaction seldom progresses to the extent where the entire particle is consumed. By employing such extended molybdenum compounds, a reduction in the total quantity of molybdenum compound required to achieve a desired degree of flame retardancy and smoke suppression is accomplished, or alternatively, the use of such extended molybdenum compounds in amounts equal to non-extended materials on an active ingredient basis provides for greater availability and effectiveness.

The particulated extender material may comprise any one of a variety of substances which are compatible with the molybdenum compounds deposited thereon, as well as with the polyvinyl chloride polymer matrix including the plasticizing agents employed and which furthermore do not adversely affect the chemical and physical properties of the polymer and the effectiveness of the flame retardant and smoke suppressant agent incorporated therein. Ordinarily, any one or combinations of two or more of the various extender fillers or pigments normally incorporated in filled polyvinyl chloride polymer systems can be satisfactorily employed which are compatible with the molybdenum compound flame and smoke suppressant agent.

The size and configuration of the extended particles may vary in consideration of the parameters as previously discussed in connection with the non-extended material. Generally, the extender particle is of a configuration which maximizes the surface area of the molybdenum compound coating thereon, and for this purpose, particles of a relatively dense structure are preferred. Porous type particles can also be satisfactorily used, provided that the molybdenum compounds which become impregnated within the interstices of the particles remain available for subsequent reaction. In consideration of the foregoing, the average particle size of the particulated extender may range from as small as about 0.1 micron up to about 25 microns and greater, with sizes ranging from about 0.2 micron to about 10 microns being preferred. The appropriate particle size of the extender material will also vary within the aforementioned ranges in consideration of such additional factors as the amount of molybdenum compound deposited therein, the types and quantities of other filler materials employed in the polyvinyl chloride polymer matrix, the total concentration of the fire and smoke suppressant molybdenum compound agent used in the formulation, the technique by which the polymer matrix is compounded, as well as the intended end use of the polymer itself.

Typical of the extended filler materials suitable for use for extending the molybdenum compound are low-cost so-called extender-type fillers consisting of finely divided solid powders which are uniformly dispersible throughout the resin mixture and typically include barium sulfates, calcium sulfates including gypsum, terra alba and plaster of Paris; calcium carbonates including whiting and chalk, magnesium carbonate, zinc carbonate, zinc oxide, silicas including quartz and diatomaceous earth, magnesium silicates and related minerals such as talc and soapstone, kaolin clay, mica, pumice, alumina and hydrated aluminas, and the like. Of the foregoing extender filler materials, calcium carbonate, hydrated aluminas, silica and talc constitute particularly satisfactory extenders in view of their low cost, availability and compatibility with polyvinyl chloride polymer systems and the molybdenum compounds incorporated therein.

The preparation of the extended form of molybdenum compound can be conveniently achieved employing a variety of techniques, such as described in U.S. Pat. Nos. 3,726,694 and 3,874,883, the substance of which is incorporated herein by reference. Briefly stated, a deposition of a desired quantity of the molybdenum compound on the surfaces of the extender particles can be conveniently achieved by slurrying the extender in an aqueous solution containing a dissolved molybdate compound which is concentrated to form a relatively thick slurry or paste, whereafter the mixture is dried and subjected to further comminution to remove any agglomerates that may have formed during the drying phase. Normally, the deposition process is carried out so as to deposit from about 1% to about 20% of the molybdenum compound, calculated as molybdenum, with amounts from about 5% to about 10% being preferred. Quantities in excess of about 20% can also be satisfactorily employed, but are less desirable from an economic standpoint. It will be understood that the extended molybdenum compound can be employed alone or in combination with molybdenum compound particles in a non-extended form to achieve optimum flame retardancy and smoke suppression characteristics on a cost-effectiveness basis.

It has also been discovered that the use of the molybdenum compound in combination with effective controlled amounts of antimony oxide or antimony compounds which liberate antimony oxide upon being subjected to the elevated temperatures encountered during combustion provide synergistic flame retardancy and smoke suppression characteristics in the plasticized polyvinyl chloride formulations. The use of antimony oxide in combination with the molybdenum compound can be performed to provide a concentration of the antimony oxide constituent in an amount of about 0.5 parts up to about 2 parts for each part of the molybdenum containing agent present. Particularly satisfactory results are achieved when these two constituents are employed in approximately equal amounts and wherein the total quantity of the combined agent is controlled within the range of about 1 up to about 8 phr, and preferably from about 2 up to about 4 phr, in the plasticized vinyl chloride polymer formulation. As in the case of the molybdenum compound, the antimony constituent can be employed neat or in an extended form employing extender materials of the same type as previously described. While antimony oxide itself constitutes a preferred material for this purpose, compounds of antimony, such as sodium antimonate or potassium antimonate, can also be employed neat or in an extended form.

In order to further illustrate the flame retardancy and smoke suppression characteristics of the ester plasticized polyvinyl chloride polymer formulations of the present invention, the following specific examples are provided. It will be understood that the examples are supplied for illustrative purposes and are not intended to be limiting of the scope of the present invention as herein described and as set forth in the subjoined claims.

EXAMPLE 1

A plasticized polyvinyl chloride formulation is compounded of a type suitable for use as a covering or jacket for electrical cables and the like. A polyvinyl chloride polymer with an inherent viscosity of 1.02 (ASTM D-1243-66) of a type commercially available under the designation Geon 103 EP from B.F. Goodrich Chemical Company is admixed with 45 phr of a mixed alkyl phthalate plasticizer commercially available under the designation Santicizer 711, available from Monsanto Company, comprised of a phthalate ester composed of 30% $C_7$ alcohol, 40% $C_9$ alcohol and 30% of $C_{11}$ alcohol. The formulation further includes 35 phr of a particulated calcium carbonate filler, commercially available under the designation Atomite from Thompson-Weihman Company; 5 phr of tribasic lead sulfate, commercially available under the designation Tribase from NL Industries, and is included as a heat stabilizer; 0.5 phr of a paraffin wax, commercially available under the designation Bareco 500 from Petrolite Corporation, and serves as a processing lubricant. In addition to the foregoing constituents, a series of sample formulations are prepared incorporating varying amounts of flame retardant and/or smoke suppressant agents of different types and an evaluation is made of their effectiveness is the basic formulation. The formulations are prepared by premixing the various constituents and thereafter blending the mixture on a two-roll mill at about 300° F, whereafter the blended material is molded into test specimens employing frame molds at 350° F under a pressure of 50,000 psi.

The composition of test samples A through L is set forth in Table 1, and further includes numerical values of the oxygen index indicative of flame retardancy and smoke generation characteristics of the various test specimens. Sample A comprises a control specimen for comparative purposes consisting of the polyvinyl chloride formulation without any flame retardant and smoke suppressant agents.

TABLE 1

| Sample | Flame Retardant Agent | Oxygen Index | Smoke Generation Date | |
|---|---|---|---|---|
| | | | Smoke Generation | Percent Reduction |
| A | None | 24.5 | 9.3 | — |
| B | 2 prh $Sb_2O_3$ | 28.0 | 6.6 | 29.0 |
| C | 3 phr $Sb_2O_3$ | 28.5 | 8.3 | 10.8 |
| D | 3 phr $MoO_3$ | 26.5 | 3.6 | 61.2 |
| E | 5 phr $MoO_3$ | 28.0 | 1.9 | 79.5 |
| F | 1 phr $Sb_2O_3$ plus 2 phr $MoO_3$ | 27.5 | 1.7 | 81.7 |
| G | 1.5 phr $Sb_2O_3$ plus 1.5 $MoO_3$ | 28.0 | 3.0 | 67.7 |
| H | 3 phr ammonium dimolybdate | 27.0 | 3.3 | 64.5 |
| I | 5 phr ammonium dimolybdate | 27.5 | 3.3 | 64.5 |
| J | 10 phr extended ammonium dimolybdate | 28.0 | 2.7 | 71.0 |
| K | 5 phr Ca—Zn $MoO_4$ extended | 29.0 | 7.8 | 16.1 |
| L | 1 phr $Sb_2O_3$ plus 2 phr $ZnMoO_4$ | 27.5 | 5.1 | 45.2 |

The oxygen index values as set forth in Table 1 are derived from ASTM Test Designation D-2863-70, entitled "Standard Method of Test for Flammability of Plastics Using the Oxygen Index Method". The test procedure determines the minimum concentration of oxygen in a slowly rising mixture of oxygen and nitrogen that will just support combustion of the test specimens. The Oxygen Index is expressed in terms of volume percent of the minimum oxygen concentration in the oxygen-nitrogen mixture and, accordingly, the higher the Oxygen Index, the better the flame retardancy characteristics of the polymer composition. Table 1 also contains smoke generation data on each of the test samples, which are derived by evaluating the smoke density using a smoke densitometer instrument designated as Model No. 95-001-03, and available from Michigan Chemical Corporation. The unit of measurement used to describe smoke density in accordance with the measurement by this instrument is smoke generation; smoke generation is the total light obscuration (the area under a percent light attenuation vs. time curve) per gram of sample of fixed size, 10 × 10 × 3 mm. The Oxygen Index is determined on test specimens of a thickness of 0.075 inch, while the smoke generation data is determined on specimens of ⅛ inch thickness.

It will be apparent from a review of the data as set forth in Table 1 that the incorporation of molybdenum trioxide in such resin formulations, as represented by samples D and E, provides for a significant improvement in the flame retardancy as well as the smoke generation characteristics of the polyvinyl chloride ester plasticized composition. The synergism provided by the use of a mixture of antimony oxide and molybdenum trioxide is typified by the results obtained on samples F and G. The use of ammonium dimolybdate also provides for significant improvements in the flame retardancy and smoke suppression characteristics of the resin formulation as represented by samples H and I. Sample J is representative of using an extended molybdenum compound comprising a particulated carrier consisting of alumina trihydrate (such as commercially available Hydral 710, from the Aluminum Company of America) having a coating of ammonium dimolybdate on the surfaces thereof present in a quantity of about 20% by weight. The extended material is of an average particle size of about 1 micron. Sample K is also representative of the use of an extended molybdenum compound comprising principally calcium molybdate deposited on a calcium carbonate carrier particle and further incorporating up to about 10% zinc oxide. This material is of a pigment grade size and also exhibits significant improvements in the flame retardancy and smoke suppression characteristics of the polymer formulation. Sample L is representative of the synergistic flame retardancy and smoke suppression characteristics attained by combining controlled amounts of antimony oxide and a molybdenum compound.

EXAMPLE 2

A second series of test samples composed of a phthalate ester plasticized polyvinyl chloride polymer is prepared employing substantially the same procedure as previously described in Example 1. The base polyvinyl chloride polymer has an inherent viscosity of 1.13 (ASTM D-1243-66), and is commercially available under the designation Geon 102 EP-F5, from B. F. Goodrich Company. The polymer formulation further includes 40 phr of the same mixed alkyl phthalate plasticizer, 5 phr of the same heat stabilizer and 0.5 phr of the same paraffin wax constituent as employed in Example 1. The vinyl chloride polymer formulation of this example employs 30 phr of a hydrated alumina available under the designation Hydral 710 from Aluminum Company of America instead of 35 phr of calcium carbonate filler as employed in the formulation of Example 1. The aluminum trihydrate filler is known to contribute some flame retardancy and smoke suppression characteristics to vinyl chloride polymers.

The base polymer is employed for preparing a series of test samples incorporating different types and varying amounts of flame retardant and smoke suppressant agents. The compositions of samples M through V are set forth in Table 2.

TABLE 2

| Sample | Flame Retardant Agent | Oxygen Index | Smoke Generation Data Smoke Generation | Percent Reduction |
|---|---|---|---|---|
| M | None | 28.0 | 6.7 | — |
| N | 3 phr $Sb_2O_3$ | 33.0 | 6.0 | 10.4 |
| O | 3 phr $MoO_3$ | 30.5 | 3.2 | 52.2 |
| P | 5 phr $MoO_2$ | 30.0 | 5.2 | 22.4 |
| Q | 1 prh $Sb_2O_3$ - 1 phr $MoO_3$ | 31.0 | 2.3 | 65.7 |
| R | 1 phr $Sb_2O_3$ - 2 phr $MoO_3$ | 32.0 | 1.0 | 85.1 |
| S | 1 phr $Sb_2O_3$ plus 2 phr ammonium octamolybdate | 30.5 | 3.6 | 46.3 |
| T | 5 phr extended ammonium dimolybdate | 29.0 | 3.1 | 53.7 |
| U | 10 phr extended ammonium dimolybdate | 30.0 | 1.7 | 74.6 |
| V | 1 phr $Sb_2O_3$ plus 2 phr $ZnMoO_4$ | 31.0 | 2.3 | 65.7 |

Sample M comprises the base formulation for control purposes devoid of any supplemental flame retardant or smoke suppressant agents. The extended ammonium dimolybdate agent employed in the preparation of samples T and U is identical to that previously described in connection with sample J of Table 1. The oxygen index and smoke generation data are obtained employing the same test procedure as previously described in connection with Example 1.

As shown in Table 2, the incorporation of 3 phr of antimony oxide in the base polymer formulation produces a substantial increase in flame retardancy but only a negligible reduction in smoke suppression as evidenced by the performance of sample N. On the other hand, the use of an equivalent amount of molybdenum trioxide as evidenced by sample O produced a significant improvement in flame retardancy accompanied by over a 50% reduction in the percentage of smoke generated. Molybdenum dioxide also imparts flame retardancy and smoke suppression characteristics. The synergistic effects provided by mixing antimony oxide and molybdenum compounds are evidenced by the data obtained in samples Q, R, S and V. In each instance, significant improvements in flame retardancy are effected, while smoke suppression of about 85% is achieved in the case of sample R. Samples T and U incorporating the extended ammonium dimolybdate also significantly contribute toward improved flame retardancy and smoke suppression characteristics of the base resin formulation.

EXAMPLE 3

An unfilled plasticized polyvinyl chloride polymer formulation suitable for use as insulation for electrical cables is formulated employing a polyvinyl chloride polymer with an inherent viscosity of 0.92 (ASTM D-1243-66), commercially available under the designation Geon 103 EP F76 from B. F. Goodrich Company, incorporating 30 phr of diisodecyl phthalate, 7 phr of tribasic lead sulfate heat stabilizer of the same type employed in Example 1, 0.4 phr of a synthetic wax commercially available under the designation Acrawax C, available from Glyco Chemicals Inc., having a nominal melting point of about 140°–143° C; 0.4 phr of a lead stearate process lubricant commercially available under the designation DS-207 from NL Industries, Inc. A series of test samples are compounded incorporating varying types and amounts of flame retardant and smoke suppressant agents as set forth in Table 3, which are subjected to flammability and smoke generation test evaluations in the same manner as previously described.

TABLE 3

| Sample | Flame Retardant Agent | Oxygen Index | Smoke Generation Data Smoke Generation | Percent Reduction |
|---|---|---|---|---|
| W | None | 27.5 | 23.2 | — |
| X | 2 phr $Sb_2O_3$ | 32.5 | 26.7 | (15.1)* |
| Y | 2 phr $MoO_3$ | 30.5 | 4.8 | 79.3 |
| Z | 1 phr $Sb_2O_3$ plus 1 phr $MoO_3$ | 32.5 | 6.1 | 73.7 |
| AA | 5 phr Ca—$ZnMoO_4$ extended | 30.5 | 9.1 | 60.8 |
| AB | 1 phr $ZnMoO_4$ extended plus 1 phr Ca—$ZnMoO_4$ extended | 30.5 | 11.3 | 51.3 |
| AC | 1 phr $Sb_2O_3$ plus 1 phr Ca—$ZnMoO_4$ extended | 31.5 | 6.8 | 70.7 |
| AD | 5 phr $ZnMoO_4$ | 31.5 | 11.2 | 51.7 |
| AE | 2 phr $CaMoO_4$ | 30.0 | 11.5 | 50.4 |
| AF | 2 phr ammonium decamolybdate | 31.5 | 4.3 | 81.4 |
| AG | 2 phr ammonium octamolybdate | 30.5 | 7.2 | 69.0 |

*( ) means increase in smoke.

As will be noted in Table 3, sample X incorporating 2 phr of antimony oxide provides for a significant increase in the oxygen index of the formulation in comparison to control sample W devoid of any flame retardant and smoke suppressant agents. However, it will be noted that the inclusion of antimony oxide in sample X effects an increase in the smoke generation characteristics of the polymer formulation. In contrast, use of a corresponding amount of molybdenum trioxide as exemplified by sample Y provides for a significant increase in the flame resistance of the formulation, while at the same time effecting a reduction in smoke of almost 80%. The synergistic effect in both flame retardancy and smoke suppression is evidenced by the results obtained on sample Z incorporating equal amounts of antimony oxide and molybdenum trioxide.

The extended molybdenum compounds employed in samples AA and AB also contribute to significant increases in the flame retardancy and smoke suppression characteristics of the polymer formulation. Each of the remaining samples tested also provide for significant increases in the flame retardancy and smoke suppression characteristics of the formulation, with sample AF evidencing a reduction in smoke generation of over 80% in combination with an oxygen index of 31.5 attributable to the addition of 2 phr of ammonium decamolybdate.

While it will be apparent that the invention herein described is well calculated to achieve the benefits and advantages hereinabove set forth, it will be appreciated that the invention is susceptible to modification, variation and change without departing from the spirit thereof.

What is claimed is:

1. A flame resistant and smoke suppressed plasticized polyvinyl chloride polymer composition consisting essentially of a polyvinyl chloride polymer, from about 20 phr to about 80 phr of an ester-type plasticizer selected from the group consisting of phthalates, azelates, adipates, trimellitates, and mixtures thereof, and a flame retardant and smoke suppressant agent consisting of a mixture of a molybdenum compound selected from the group consisting of molybdenum oxides and molybdate salts and an antimony compound selected from the group consisting of antimony oxide, sodium antimonate, potassium antimonate, and mixtures thereof present in an amount of about 1 phr to about 8 phr, said antimony compound present in an amount of about 0.5 parts up to about 2 parts per part of said molybdenum compound present.

2. The polymer composition as defined in claim 1, in which said flame retardant and smoke suppressant agent is present in an amount of about 2 phr to about 4 phr.

3. The polymer composition as defined in claim 1, in which said flame retardant and said smoke suppressant agent is present in the form of particles of an average size of less than 20 mesh and distributed substantially uniformly throughout said composition.

4. The polymer composition as defined in claim 1, wherein said flame retardant and smoke suppressant agent is present in the form of particles of an average particle size of less than about 10 microns and distributed substantially uniformly throughout said composition.

5. The polymer composition as defined in claim 1, wherein said molybdenum compound comprises molybdenum trioxide.

6. The polymer composition as defined in claim 1, wherein said molybdenum compound comprises molybdenum dioxide.

7. The polymer composition as defined in claim 1, wherein said molybdenum compound comprises an ammonium molybdate salt.

8. The polymer composition as defined in claim 1, wherein said molybdenum compound comprises calcium molybdate.

9. The polymer composition as defined in claim 1, wherein said molybdenum compound comprises sodium molybdate.

10. The polymer composition as defined in claim 1, wherein said molybdenum compound comprises zinc molybdate.

11. The polymer composition as defined in claim 1, wherein at least a portion of said molybdenum compound is present in the form of a coating on the surfaces of an extender filler.

12. The polymer composition as defined in claim 11, in which the coated said extender filler contains from about 1% to about 20% of said molybdenum compound.

13. The polymer composition as defined in claim 1, in which at least a portion of said antimony compound is present in the form of a coating on the surfaces of an extender filler.

* * * * *

UNITED STATES PATENT AND TRADEMARK OFFICE
CERTIFICATE OF CORRECTION

PATENT NO. : 4,098,753
DATED : July 4, 1978
INVENTOR(S) : Tsigdinos et al.

It is certified that error appears in the above-identified patent and that said Letters Patent are hereby corrected as shown below:

Abstract page, [56], Column 2, line 1, "47.75" should have been --45.75--. Column 3, line 40, "de" should have been --di--. Column 5, line 44, "therein" should have been --thereon--. Column 7, line 19, "is" should have been --in--.

Signed and Sealed this

Thirteenth Day of February 1979

[SEAL]

Attest:

RUTH C. MASON
Attesting Officer

DONALD W. BANNER
Commissioner of Patents and Trademarks